United States Patent
Morrison et al.

(10) Patent No.: US 9,992,179 B2
(45) Date of Patent: Jun. 5, 2018

(54) MESSAGE ENCRYPTION SYSTEM

(71) Applicant: ZixCorp Systems, Inc., Dallas, TX (US)

(72) Inventors: Kelly Sue Morrison, Dallas, TX (US); Bryan Adam Joyner, Plano, TX (US); Patrick Stephen Trantham, Mesquite, TX (US); David Vincent Care, Dallas, TX (US)

(73) Assignee: ZixCorp Systems, Inc., Dallas, TX (US)

( * ) Notice: Subject to any disclaimer, the term of this patent is extended or adjusted under 35 U.S.C. 154(b) by 160 days.

(21) Appl. No.: 15/012,490

(22) Filed: Feb. 1, 2016

(65) Prior Publication Data
US 2017/0222989 A1   Aug. 3, 2017

(51) Int. Cl.
*G06F 15/16* (2006.01)
*H04L 29/06* (2006.01)
*H04L 9/00* (2006.01)
*H04L 12/58* (2006.01)

(52) U.S. Cl.
CPC .......... *H04L 63/0471* (2013.01); *H04L 51/12* (2013.01); *H04L 51/28* (2013.01); *H04L 63/0236* (2013.01); *H04L 63/126* (2013.01); *H04L 63/205* (2013.01)

(58) Field of Classification Search
CPC .................................................. H04L 63/0471
See application file for complete search history.

(56) References Cited

U.S. PATENT DOCUMENTS

| | | | | |
|---|---|---|---|---|
| 7,249,175 B1* | 7/2007 | Donaldson | ........... | G06Q 10/107 709/206 |
| 9,686,308 B1* | 6/2017 | Srivastava | .......... | H04L 63/1441 |
| 2014/0101775 A1* | 4/2014 | Cheung | ............... | H04L 63/0428 726/27 |

OTHER PUBLICATIONS

PCT Notification of Transmittal of the International Search Report and the Written Opinion of the International Searching Authority, or the Declaration, 13 pagees, dated Apr. 11, 2017.

(Continued)

*Primary Examiner* — Alexander Lagor
*Assistant Examiner* — Syed M Ahsan
(74) *Attorney, Agent, or Firm* — Baker Botts L.L.P.

(57) ABSTRACT

A system includes a plurality of mail encryption gateways and a router. Each mail encryption gateway encrypts email according to an encryption policy of a customer. The router stores a plurality of sender policy framework (SPF) records. The router also receives an email and compares a source IP address of the email with the plurality of SPF records. The router determines that the source IP address corresponds to an SPF record of the plurality of SPF records and in response to that determination, determines that a Simple Mail Transfer Protocol From Field of the email comprises a domain of a cloud provider corresponding to the SPF record. In response to that determination, the router determines that a Multipurpose Internet Mail Extension From Field of the email comprises a domain of a customer and in response to that determination, routes the email to a mail encryption gateway.

18 Claims, 3 Drawing Sheets

(56) References Cited

OTHER PUBLICATIONS

Kucherawy M. "Message Header Field for Indicating Message Authentication Status",RFC7601.TXT Internet Engineering Task Force IETF, Standard Internet Society, pp. 1-53, Aug. 21, 2015.
Kitterman Technical Services "Sender Policy Framework (SPF) for Authorizing Use of Domains in Email, Version 1; rfc7208.txt", Sender Plicy Framework, Standard Internet Society, pp. 1-64, Apr. 25, 2014.

* cited by examiner

MESSAGE ENCRYPTION SYSTEM

TECHNICAL FIELD

This disclosure relates generally to a system for encrypting messages.

BACKGROUND

Messages may be encrypted using various schemes to improve the security of the message and message communication.

SUMMARY OF THE DISCLOSURE

According to one embodiment, an apparatus includes a memory and a processor. The memory stores a plurality of sender policy framework (SPF) records. Each SPF record of the plurality of SPF records corresponds to a cloud provider. The processor receives an email and compares a source IP address of the email with the plurality of SPF records. The processor determines, based on comparing the source IP address of the email with the plurality of SPF records, that the source IP address corresponds to an SPF record of the plurality of SPF records and in response to that determination, determines that a Simple Mail Transfer Protocol (SMTP) From Field of the email comprises a domain of a cloud provider corresponding to the SPF record. In response to that determination, the processor determines that a Multipurpose Internet Mail Extension (MIME) From Field of the email comprises a domain of a customer, and in response to that determination, the processor routes the email to a mail encryption gateway corresponding to the customer. The mail encryption gateway encrypts the email according to an encryption policy of the customer.

According to one embodiment, a method includes storing a plurality of sender policy framework (SPF) records. Each SPF record of the plurality of SPF records corresponds to a cloud provider. The method also includes receiving an email and comparing a source IP address of the email with the plurality of SPF records. The method further includes determining, based on comparing the source IP address of the email with the plurality of SPF records, that the source IP address corresponds to an SPF record of the plurality of SPF records and in response to that determination, determining that a Simple Mail Transfer Protocol (SMTP) From Field of the email comprises a domain of a cloud provider corresponding to the SPF record. The method also includes in response to that determination, determining that a Multipurpose Internet Mail Extension (MIME) From Field of the email comprises a domain of a customer and in response to that determination, routing the email to a mail encryption gateway corresponding to the customer. The mail encryption gateway encrypts the email according to an encryption policy of the customer.

According to another embodiment, a system includes a plurality of mail encryption gateways and a router. Each mail encryption gateway encrypts email according to an encryption policy of a customer. The router stores a plurality of sender policy framework (SPF) records. Each SPF record of the plurality of SPF records corresponds to a cloud provider. The router also receives an email and compares a source IP address of the email with the plurality of SPF records. The router determines, based on comparing the source IP address of the email with the plurality of SPF records, that the source IP address corresponds to an SPF record of the plurality of SPF records and in response to that determination, determines that a Simple Mail Transfer Protocol (SMTP) From Field of the email comprises a domain of a cloud provider corresponding to the SPF record. In response to that determination, the router determines that a Multipurpose Internet Mail Extension (MIME) From Field of the email comprises a domain of a customer and in response to that determination, routes the email to a mail encryption gateway of the plurality of mail encryption gateways corresponding to the customer.

Certain embodiments may provide one or more technical advantages. For example, an embodiment ensures that calendar invitations are encrypted according to the encryption standards of a sender. As another example, an embodiment ensures that out of office messages are encrypted according to the encryption standards of a sender. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
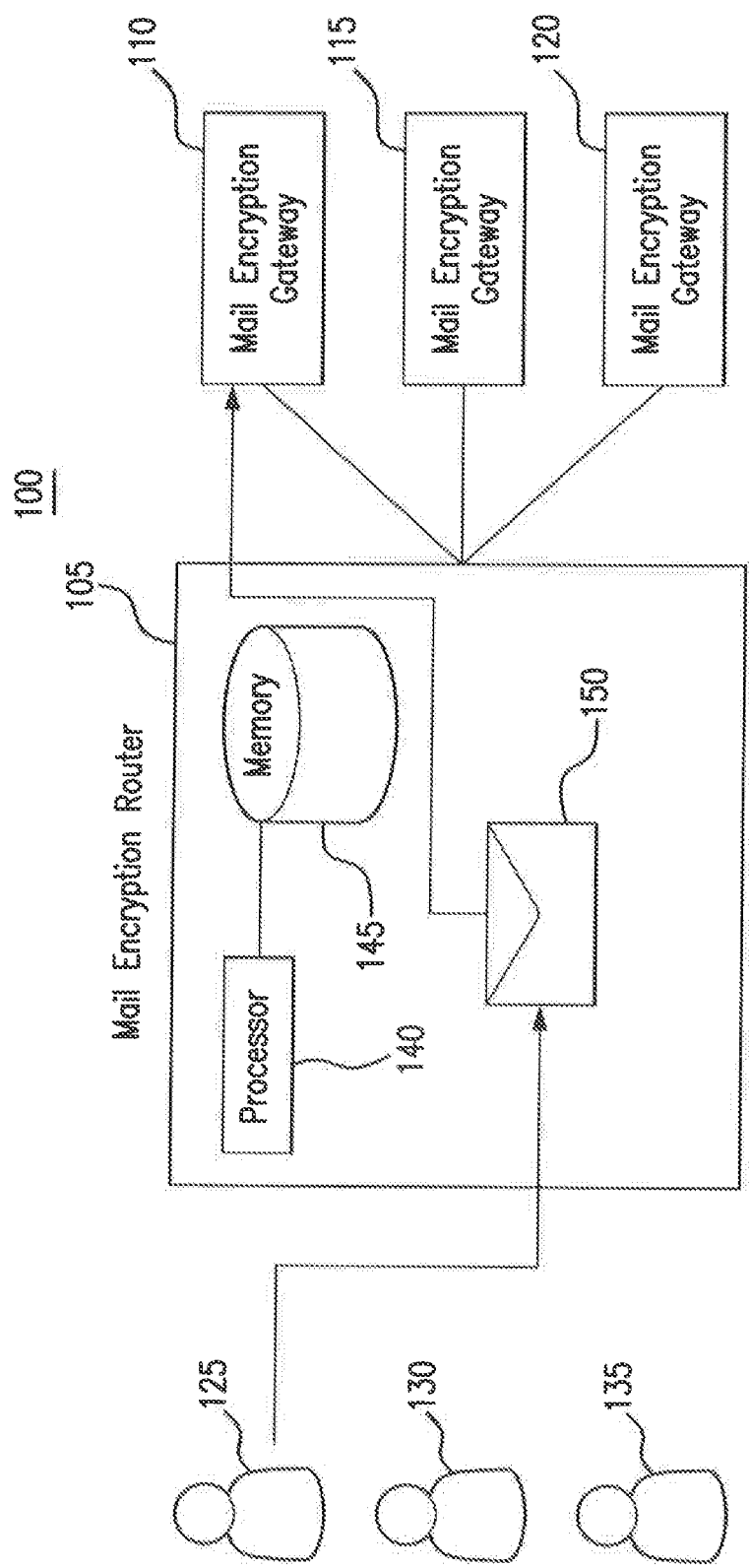
FIG. 1 illustrates an example system for encrypting messages.
Figure 2:
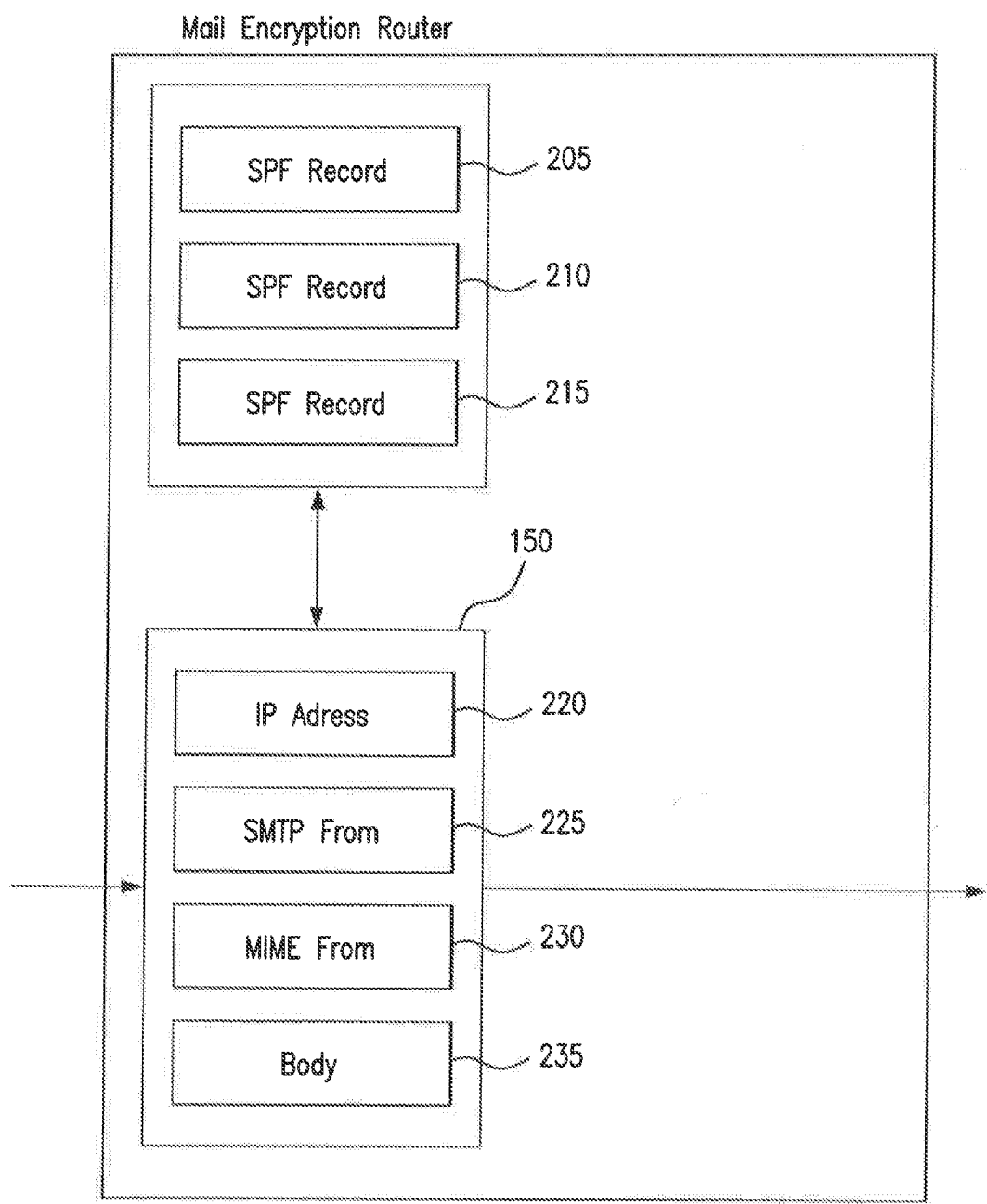
FIG. 2 illustrates a mail encryption router of the system of FIG. 1.
Figure 3:
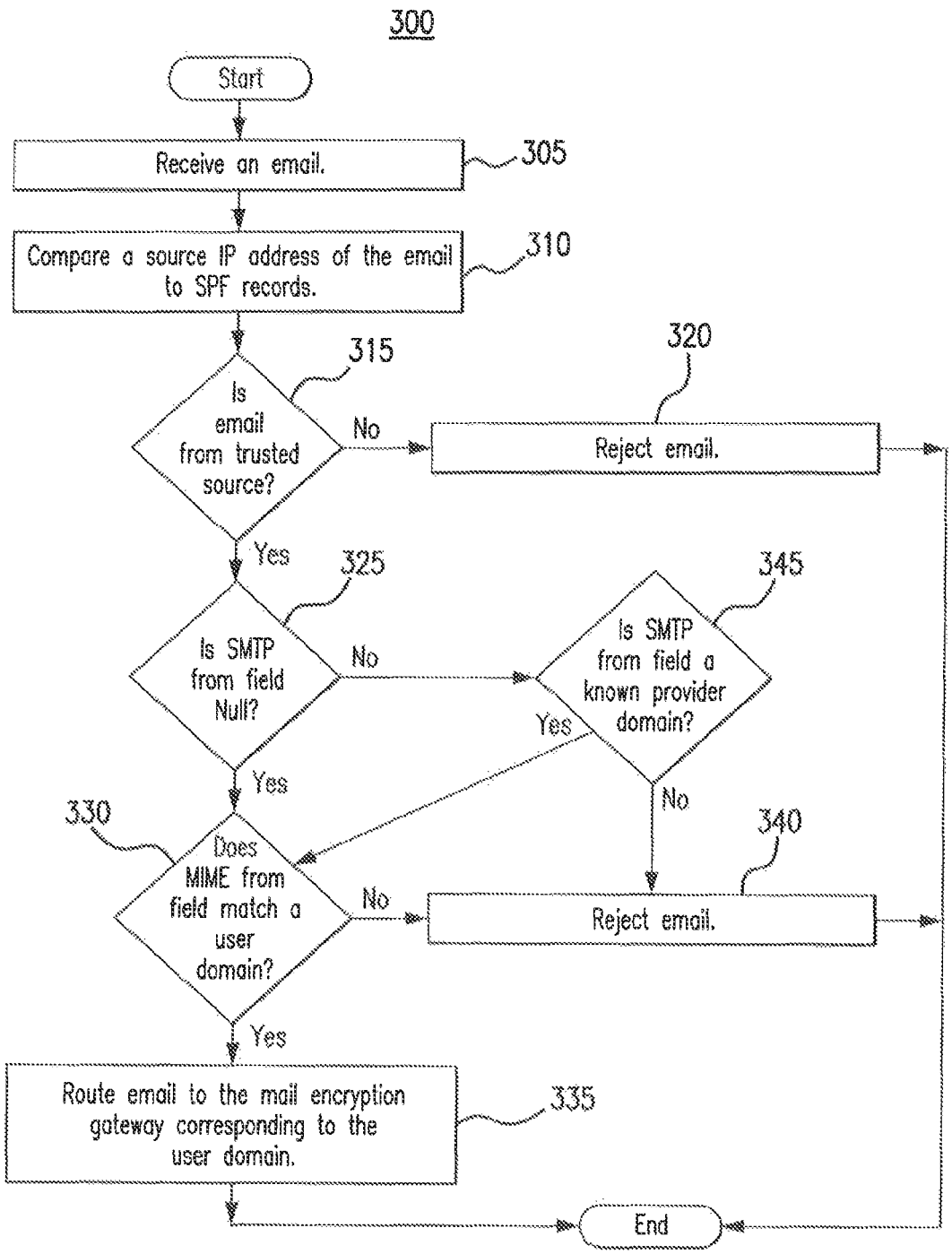
FIG. 3 is a flowchart illustrating a method of encrypting a message using the system of FIG. 1.

Embodiments of the present disclosure and its advantages are best understood by referring to FIGS. 1 through 3 of the drawings, like numerals being used for like and corresponding parts of the various drawings.

Certain embodiments of the present disclosure relate to a hosted email service. A hosted email service may process emails on behalf of a number of customers. Examples of customers may include small to medium sized businesses that have decided to use the hosted email service to process emails, rather than having to purchase, provision, and maintain equipment for processing the mails themselves. In certain embodiments, the hosted email service may process emails according to encryption policies, branding policies, routing policies, or other policies that have been customized for each customer. To provide the customization, the hosted email service may process emails from a particular customer using a particular gateway that has been configured to apply that customer's requirements. For example, the hosted email service may process emails from customer A using gateway A and may process emails from customer B using gateway B.

In certain embodiments, it may be efficient for the hosted email service to receive entails from multiple customers at the same place. For example, the hosted email service may receive emails from customer A and emails from customer B at the same IP address. Upon receiving an email, the hosted email service determines the sender of the email in order to route the email to the gateway that has been configured to apply the sender's requirements. Certain embodiments of the present disclosure may provide systems and methods for determining the sender of an email.

In some systems, to determine the appropriate encryption scheme for an email, the system may first verify a source of the received email, for example, to ensure that the email is from a trusted source. After the source has been verified, the system may determine the sender of the email by examining the Simple Mail Transfer Protocol (SMTP) From Field and a source IP address of the email. Based on that information the system may determine the sender of the email and encrypt the email based on the desires of the sender.

In some instances, examining the source IF address and the SMTP From Field of the email is not sufficient to determine the source of the email. For example, certain out-of-office messages have an SMTP From Field that is null. As another example, certain calendar invites have an SMTP From Field that does not identify a particular user but rather a service provider such as a calendar service. In these instances, it may not be possible to determine the appropriate encryption scheme by simply examining the SMTP From Field and the source IP address of the email.

This disclosure contemplates an encryption system that appropriately handles certain types of emails such as out-of-office messages and calendar invites where the SMTP From Field and the source IP address do not provide enough information to determine the sender and/or the appropriate encryption scheme for the email. When the system receives an email, the system first verifies that the email came from a trusted source. If the email came from a trusted source, then the system examines the SMTP From Field and the source IP address of the email to determine the sender and/or the appropriate encryption scheme for the email. If the SMTP From Field and the source IP address do not provide enough information to determine the sender and/or the appropriate encryption scheme, the system then examines the Multipurpose Internet Mail Extension (MIME) From Field to see if it corresponds to a particular user. If so, the system then encrypts the email according to that user's preferences and/or desires.

In certain embodiments, the system ensures that calendar invitations are encrypted according to the encryption standards of a sender. In some embodiments, the system ensures that out-of-office messages are encrypted according to the encryption standards of a sender.

Messages may be encrypted using various schemes to improve the security of the message and message communication. For example, messages may be encrypted using AES, Triple DES, RC4, RSA, and/or Rabin encryption. Different users may select different encryption methods based on personal preference or individual technological needs. When an email is sent, the email should be encrypted based on how the sender of the email desires the email to be encrypted before the email is communicated to the intended recipient. For example, if a sender desires to encrypt emails using AES encryption then a received email should be encrypted using AES before being communicated to the intended recipient. In some instances, the sender may desire a certain type of encryption be performed based on requirements of the intended recipient.

FIGS. 1 through 3 will be used to describe the mail encryption system. FIG. 1 will describe the system generally. FIGS. 2 and 3 will describe the operation of the system in more detail.

FIG. 1 illustrates an example system 100 for encrypting messages. As illustrated in FIG. 1, system 100 includes a mail encryption router 105 and one or more mail encryption gateways 110, 115 and 120. This disclosure contemplates system 100 including any appropriate number of mail encryption routers 105 and mail encryption gateways 110, 115 and 120. In certain embodiments, system 100 verifies the source of a received email 150, and appropriately routes email 150 to the mail encryption gateway 110, 115, or 120 corresponding to that source even if email 150 is an out-of-office message or calendar invitation.

Mail encryption router 105 includes a processor 140 and a memory 145. This disclosure contemplates processor 140 and memory 145 being configured to perform any of the functions of mail encryption router 105 described herein. For example, processor 140 and memory 145 may be configured to examine incoming emails 150 to determine an appropriate mail encryption gateway 110, 115 or 120 and to route email 150 to the appropriate mail encryption gateway 110, 115 or 120.

Processor 140 is any electronic circuitry, including, but not limited to microprocessors, application specific integrated circuits (ASIC), application specific instruction set processor (ASIP), and/or state machines, that communicatively couples to memory 145 and controls the operation of mail encryption router 105. Processor 140 may be 8-bit, 16-bit, 32-bit, 64-bit or of any other suitable architecture. Processor 140 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 140 may include other hardware and software that operates to control and process information. Processor 140 executes software stored on memory 145 to perform any of the functions described herein. Processor 140 controls the operation and administration of mail encryption router 105 by processing received information. Processor 140 may be a programmable logic device, a microcontroller, a microprocessor, any suitable processing device, or any suitable combination of the preceding. Processor 140 is not limited to a single processing device and may encompass multiple processing devices.

Memory 145 may store, either permanently or temporarily, data, operational software, or other information for processor 130. Memory 145 may include any one or a combination of volatile or non-volatile local or remote devices suitable for storing information. For example, memory 145 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 145, a disk, a CD, or a flash drive. In particular embodiments, the software may include an application executable by processor 140 to perform one or more of the functions described herein.

Mail encryption router 105 receives incoming email 150. Mail encryption router 105 may examine email 150 to verify the source of email 150. After the source of email 150 has been verified, mail encryption router 105 may further examine email 150 to determine which mail encryption gateway 110, 115 and 120 should email 150 be sent. Mail encryption gateway 110, 115 or 120 may then encrypt email 150 based on the preferences and/or needs of user 125, 130 or 135, respectively.

Mail encryption router 105 may verify a source of email 150. For example, mail encryption router 105 may examine a source IP address of email 150 to determine that email 150 came from an exchange server of an on-premise user. As another example, mail encryption router 105 may determine, based on a source IP address of email 150, that email 150 came from a cloud provider. In some embodiments, mail encryption router 105 may compare a source IP address of email 150 with one or more sender policy framework (SPF) records to determine that email 150 came from a cloud provider. This disclosure contemplates email 150 coming from any appropriate cloud provider such as, for example, an internet mail service, calendar service, messaging service, and/or any other appropriate service. If mail encryption router 105 is unable to verify the source of email 150, then mail encryption router 105 may reject email 150. In certain embodiments, mail encryption router 105 may communicate a message to a sender of email 150 to notify the sender that email 150 has been rejected.

In the illustrated example of FIG. 1, mail encryption router may examiner a source IP address of email 150 to determine a source associated with user 125. For example, if user 125 is an on-premise user who sent email 150 through an exchange server, mail encryption router 105 may verify whether that exchange server is a trusted source. As another example, if user 125 sent email 150 through an Internet mail provider, mail encryption router 105 may determine that email 150 was sourced through that mail provider by examining a source IP address of email 150 and then verify whether that mail provider is a trusted source. In some embodiments, mail encryption router 105 may determine that email 150 was sourced through the Internet mail provider by comparing the source IP address of email 150 with one or more SPF records.

If mail encryption router 105 verities the source of the email, mail encryption router 105 may then proceed to determine a user 125, 130 or 135 who sent email 150. After mail encryption router 105 determines the user 125, 130 or 135 who sent email 150, mail encryption router 105 may route email 150 to the mail encryption gateway 110, 115 or 120 corresponding to the user 125, 130 or 135 who sent email 150. In the illustrated example of FIG. 1, mail encryption router 105 determines that user 125 sent email 150. In response to that determination, mail encryption router 105 routes email 150 to mail encryption gateway 110, which corresponds to user 125. In this manner, mail encryption gateway 110 may encrypt email 150 according to the desires and needs of user 125.

Each mail encryption gateway 110, 115 or 120 corresponds to a user 125, 130 or 135 or to a domain of user 125, 130, or 135. Each mail encryption gateway 110, 115 or 120 performs a type of encryption corresponding to user 125, 130 or 135. For example, mail encryption gateway 110, 115 and 120 may correspond to users 125, 130 and 135 respectively. Mail encryption gateway 110 may perform a type of encryption desired or needed by user 125 or by a domain of user 125. Mail encryption gateway 115 may perform a type of encryption desired or needed by user 130 or by a domain of user 130. Mail encryption gateway 120 may perform a type of encryption desired or needed by user 135 or a domain of user 135. When email 150 is routed to mail encryption gateway 110, 115 or 120, mail encryption gateway 110, 115 or 120 may encrypt email 150 according to the type of encryption associated with mail encryption gateway 110, 115, or 120. For example, if user 125 or a domain of user 125 needs emails to be AES encrypted, then when email 150 is routed to mail encryption gateway 110, mail encryption gateway 110 may perform AES encryption on email 150. After email 150 has been encrypted, mail encryption gateway 110 may communicate encrypted email 150 to its intended recipient.

Users 125, 130 and 135 may be individual users. Users 125, 130 and 135 may also be collections of users that belong to particular domains. For example, user 125 may be a corporate entity with multiple email users. In that instance, mail encryption gateway 110 which corresponds to user 125 may perform a type of encryption desired or needed by the corporate entity.

In certain embodiments, by using system 100, email 150 may be appropriately encrypted for the needs and/or desires of a particular user or of a group of users. In some embodiments, by using system 100, emails from multiple users and/or entities may be encrypted based on those users' or entities' needs and/or desires. FIGS. 2 and 3 will describe the operation of system 100 in more detail.

FIG. 2 illustrates a mail encryption router 105 of the system 100 of FIG. 1. Although certain components of mail encryption router 105 are not illustrated in FIG. 2, their omission should not be construed as their removal from mail encryption router 105. As illustrated in FIG. 2, mail encryption router 105 may store one or more SPF records 205, 210 and 215. Mail encryption router 105 may also receive email 150 and route email 150 to an appropriate mail encryption gateway.

Mail encryption router 105 may receive email 150. As discussed previously, email 150 may have been written and/or sent by a user. Email 150 may include certain fields that can be analyzed by mail encryption router 105. For example, email 150 may include an IP address 220, an SMTP From Field 225, a MIME From Field 230, and a body 235. IP address 220 may be an IP address of a sender of email 150 such as, for example, a source IP address. SMTP From Field 225 may include identifying information of the sender of email 150. For example, SMTP From Field 225 may include an email address of the sender of email 150. MIME From Field 230 may also include identifying information of the sender of email 150. For example, MIME From Field 230 may include an email address of the sender of email 150 and a name of the sender of email 150. Body 235 may include the text of email 150 that is intended to be read by the recipient of email 150.

Mail encryption router 150 may verify the source of email 150 after receiving email 150. In some embodiments, mail encryption router 105 verifies the source of email 150 by examining IP address 220 of email 150. For example, IP address 220 may indicate that the sender of email 150 is an on-premise user that sent email 150 through a trusted exchange server. As another example, IP address 220 may match an IP address of a trusted cloud and/or service provider such as an internet mail service. In that instance, mail encryption router 105 may determine that email 150 came from the cloud and/or service provider. In certain embodiments, mail encryption router 105 compares IP address 220 with the one or more SPF records 205, 210 and 215. Each SPF record 205, 210 and 215 may identify the IP addresses of a trusted cloud and/or service provider. For example, SPF record 205 may identify the IP addresses of each mail server of a particular cloud or service provider. If IP address 220 of email 150 matches one or more of the IP addresses of an SPF record 205, 210 or 215, mail encryption router 105 may determine that email 150 came from the cloud and/or service provider associated with that SPF record. In this manner, mail encryption router 105 may verify the source of email 150. If IP address 220 does not match a trusted IP address of an on-premise user, a trusted IP address of a cloud or service provider, or a trusted IP address identified by an SPF record, then mail encryption router 105 may determine that email 150 came from an untrusted source. In that instance, mail encryption router 105 rejects mail 150. As discussed previously, mail encryption router 105 may communicate a message to a sender of email 150 to notify the sender that email 150 has been rejected.

If mail encryption router 105 determines that email 150 came from a trusted source, mail encryption router 105 may then determine which mail encryption gateway should email 150 be sent. In many cases, mail encryption router 105 may determine the appropriate mail encryption gateway by examining IP address 220 and SMTP From Field 225. In these instances, IP address 220 and SMTP From Field 225 identify the user who sent email 150 and/or the domain of the user who sent email 150. Based on that identification, mail encryption router 105 may route email 150 to the mail encryption gateway that corresponds to that user or to the domain of that user. The mail encryption gateway then performs the type of encryption that the user who sent email 150 desires or needs. The email may then be sent to an intended recipient.

In some instances, IP address 220 and SMTP From Field 225 are insufficient to identify the sender of email 150. For example, when email 150 is an out-of-office message, SMTP From Field 225 may be null. As another example, when email 150 is a calendar invite, SMTP From Field 225 may identify only a cloud and/or service provider such as, for example, a calendar service, rather than the user. In these instances, mail encryption router 105 may perform extra processing of email 150 to determine the sender of email 150. For example, if email 150 is an out-of-office message, mail encryption router 105 may first examine IP address 220 and determine that IP address 220 identifies an on-premise user operating through a trusted exchange server. Mail encryption router 105 may then examine SMTP From Field 225 and determine that it is null. Based on IP address 220 and SMTP From Field 225, mail encryption router 105 may determine that email 150 is an out-of-office message. In response to that determination, mail encryption router 105 may examine MIME From Field 230 to determine the sender of email 150 and/or the domain of the sender of email 150. Then, based on that information, mail encryption router 105 routes email 150 to the appropriate mail encryption gateway.

As another example, if email 150 is a calendar invite, mail encryption router 105 may first examine IP address 220 to determine that IP address 220 corresponds to an IP address of a trusted cloud and/or service provider. Mail encryption router 105 may then examine SMTP From Field 225 and determine that SMTP From Field 225 identifies a cloud and/or service provider. Based on this information, mail encryption router 105 may determine that email 150 is a calendar invite. In response to that determination, mail encryption router 105 may examine the MIME From Field 230 to determine the sender of email 150 and/or the domain of the sender of email 150. Mail encryption router 105 may then route email 150 to the appropriate mail encryption gateway.

If mail encryption router 105 fails to associate email 150 with a user and/or a domain of a user that sent email 150, then mail encryption router 105 may reject email 150. Mail encryption router 105 may reject email 150 by communicating a message indicating that email 150 has been rejected. The rejection message may be communicated back to a sender of email 150.

Mail encryption router 105 may route email 150 to an appropriate mail encryption gateway. Before communicating email 150 to the mail encryption gateway, mail encryption router 105 may add a code to the header of email 150. The code may identify the user who sent email 150, the domain of the user who sent email 150, and/or the mail encryption gateway corresponding to the user and/or to the domain of the user. That code may then be used by other components of system 100 to communicate email 150 to the appropriate mail encryption gateway.

In certain embodiments, using mail encryption router 105 may ensure that calendar invites and out-of-office messages are encrypted according to the desires and/or preferences of a user. In some embodiments, using mail encryption router 105 may ensure that email from multiple users across multiple domains may be encrypted according to the needs and preferences of the users who sent those emails.

FIG. 3 is a flowchart illustrating a method 300 of encrypting a message using the system of FIG. 1. In certain embodiments, mail encryption router 105 may perform method 300. By performing method 300, mail encryption router 105 may ensure that calendar invites and out-of-office messages are encrypted appropriately.

Mail encryption router 105 may begin in step 305 by receiving an email. In step 310, mail encryption router 105 compares a source IP address of the email to SPF records stored in mail encryption router 105. In step 315, mail encryption router 105 determines whether the email comes from a trusted source. If the email did not come from a trusted source, mail encryption router 105 rejects the email in step 320.

If the email came from a trusted source, mail encryption router 105 continues to step 325 to determine if the SMTP From Field of the email is null. If the SMTP From Field is null, mail encryption router 105 continues to step 330 to determine whether a MIME From Field matches a user and/or a user domain. If the MIME From Field does not match a user or user domain, mail encryption router 105 may reject the email in step 340. If the MIME From Field matches a user or user domain, mail encryption router 105 continues to step 335 to route the email to the mail encryption gateway corresponding to the user or the user domain.

If the SMTP From Field is not null, mail encryption router 105 continues to step 345 to determine if the SMTP From Field identifies a known provider or known provider domain. If the SMTP From Field does not identify a known provider or known provider domain, mail encryption router 105 rejects the email in step 340.

If the SMTP From Field identities a known provider or known provider domain, mail encryption router 105 continues to step 330 to determine whether the MIME From Field matches a user or user domain. If the MIME From Field does not match a user or user domain, mail encryption router 105 rejects the email in step 340. If the MIME From Field matches a user or user domain, mail encryption router 105 routes the email to the mail encryption gateway corresponding to the user or user domain in step 335.

Modifications, additions, or omissions may be made to method 400 depicted in FIG. 3. Method 300 may include more, fewer, or other steps. For example, steps may be performed in parallel or in any suitable order. While discussed as mail encryption router 105 performing the steps, any suitable component of system 100, such as mail encryption gateway 110, 115, or 120 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
a memory configured to store a plurality of sender policy framework (SPF) records, each SPF record of the plurality of SPF records corresponding to a cloud provider; and
a processor communicatively coupled to the memory, the processor configured to:
receive a first email and a second email;
compare a source IP address of the first email with the plurality of SPF records;
determine, based on comparing the source IP address of the first email with the plurality of SPF records, that the source IP address corresponds to an SPF record of the plurality of SPF records;
in response to the determination that the source IP address corresponds to the SPF record, determine that a simple mail transfer protocol (SMTP) From Field of the first email comprises a domain of a cloud provider corresponding to the SPF record;
in response to the determination that the SMTP From Field of the email comprises the domain of the cloud provider corresponding to the SPF record, determine that a multipurpose internet mail extension (MIME) From Field of the email comprises a domain of a first customer;
in response to the determination that the MIME From Field of the first email comprises the domain of the first customer, route the email to a first mail encryption gateway corresponding to the first customer, the first mail encryption gateway configured to encrypt the email according to an encryption policy of the first customer;
determine that a source IP address of the second email matches an IP address of a second customer different from the first customer;
in response to the determination that the source IP address of the second email matches the IP address of the second customer, determine that an SMTP From Field of the second email is null;
in response to the determination that the SMTP From Field of the second email is null, determine that a MIME From Field of the second email comprises a domain of the second customer; and
in response to the determination that the MIME From Field of the second email comprises the domain of the second customer, route the second email to a second mail encryption gateway corresponding to the second customer, the second mail encryption gateway different from the first mail encryption gateway, the second mail encryption gateway configured to encrypt the second email according to an encryption policy of the second customer.

2. The apparatus of claim 1, wherein the processor is further configured to:
receive a third email;
determine that a source IP address of the third email does not correspond to at least one of an IP address of a third customer, an IP address of a cloud provider, and an SPF record corresponding to the cloud provider; and
in response to the determination that the source IP address of the third email does not correspond to at least one of the IP address of a third customer, the IP address of a cloud provider, and the SPF record corresponding to the cloud provider, communicate a message indicating that the third email is rejected.

3. The apparatus of claim 1, wherein the processor is further configured to:
receive a third email;
determine at least one of that an SMTP From Field of the third email does not comprise a domain of a third customer and that a MIME From Field of the third email does not comprise the domain of the third customer; and
in response to the determination that at least one of that the SMTP From Field of the third email does not comprise the domain of the third customer and that the MIME From Field of the third email does not comprise the domain of the third customer, communicate a message indicating that the third email is rejected.

4. The apparatus of claim 1, wherein the processor is further configured to:
receive a third email;
determine that a source IP address of the email matches an IP address of a third customer;
in response to the determination that the source IP address of the email matches the IP address of the third customer, determine that an SMTP From Field of the third email comprises a domain of the third customer; and
in response to the determination that the SMTP From Field of the third email comprises the domain of the customer, route the third email to a third mail encryption gateway corresponding to the third customer, the third mail encryption gateway configured to encrypt the third email according to an encryption policy of the third customer.

5. The apparatus of claim 1, wherein the first mail encryption gateway sends the encrypted first email to an intended recipient of the first email.

6. The apparatus of claim 1, wherein routing the first email to the first mail encryption gateway comprises inserting into a MIME header of the first email a code corresponding to the first customer.

7. A method comprising:
storing a plurality of sender policy framework (SPF) records, each SPF record of the plurality of SPF records corresponding to a cloud provider; and
receiving a first email and a second email;
comparing a source IP address of the first email with the plurality of SPF records;
determining, based on comparing the source IP address of the first email with the plurality of SPF records, that the source IP address corresponds to an SPF record of the plurality of SPF records;
in response to the determination that the source IP address corresponds to the SPF record, determining that a simple mail transfer protocol (SMTP) From Field of the first email comprises a domain of a cloud provider corresponding to the SPF record;
in response to the determination that the SMTP From Field of the email comprises the domain of the cloud provider corresponding to the SPF record, determining that a multipurpose internet mail extension (MIME) From Field of the email comprises a domain of a first customer;
in response to the determination that the MIME From Field of the first email comprises the domain of the first customer, routing the first email to a first mail encryption gateway corresponding to the first customer, the first mail encryption gateway configured to encrypt the first email according to an encryption policy of the first customer;

determining that a source IP address of the second email matches an IP address of a second customer different from the first customer;

in response to the determination that the source IP address of the second email matches the IP address of the second customer, determining that an SMTP From Field of the second email is null;

in response to the determination that the SMTP From Field of the second email is null, determining that a MIME From Field of the second email comprises a domain of the second customer; and in response to the determination that the MIME From Field of the second email comprises the domain of the second customer, routing the second email to a second mail encryption gateway corresponding to the second customer, the second mail encryption gateway configured to encrypt the second email according to an encryption policy of the second customer.

8. The method of claim 7, further comprising:

receiving a third email;

determining that a source IP address of the third email does not correspond to at least one of an IP address of a third customer, an IP address of a cloud provider, and an SPF record corresponding to the cloud provider; and in response to the determination that the source IP address of the third email does not correspond to at least one of the IP address of a third customer, the IP address of a cloud provider, and the SPF record corresponding to the cloud provider, communicating a message indicating that the third email is rejected.

9. The method of claim 7, further comprising:

receiving a third email;

determining at least one of that an SMTP From Field of the third email does not comprise a domain of a third customer and that a MIME From Field of the third email does not comprise the domain of the third customer; and in response to the determination that at least one of that the SMTP From Field of the third email does not comprise the domain of the third customer and that the MIME From Field of the third email does not comprise the domain of the third customer, communicating a message indicating that the third email is rejected.

10. The method of claim 7, further comprising:

receiving a third email;

determining that a source IP address of the third email matches an IP address of a third customer;

in response to the determination that the source IP address of the third email matches the IP address of the third customer, determining that an SMTP From Field of the third email comprises a domain of the third customer; and in response to the determination that the SMTP From Field of the third email comprises the domain of the third customer, routing the third email to a third mail encryption gateway corresponding to the third customer, the third mail encryption gateway configured to encrypt the third email according to an encryption policy of the third customer.

11. The method of claim 7, wherein the first mail encryption gateway sends the encrypted first email to an intended recipient of the first email.

12. The method of claim 7, wherein routing the first email to the first mail encryption gateway comprises inserting into a MIME header of the first email a code corresponding to the first customer.

13. A system comprising:

a plurality of mail encryption gateways, each mail encryption gateway configured to encrypt email according to an encryption policy of a customer; and a router communicatively coupled to each mail encryption gateway of the plurality of mail encryption gateways, the router configured to:

store a plurality of sender policy framework (SPF) records, each SPF record of the plurality of SPF records corresponding to a cloud provider;

receive a first email and a second email;

compare a source IP address of the first email with the plurality of SPF records;

determine, based on comparing the source IP address of the first email with the plurality of SPF records, that the source IP address corresponds to an SPF record of the plurality of SPF records;

in response to the determination that the source IP address corresponds to the SPF record, determine that a simple mail transfer protocol (SMTP) From Field of the first email comprises a domain of a cloud provider corresponding to the SPF record;

in response to the determination that the SMTP From Field of the first email comprises the domain of the cloud provider corresponding to the SPF record, determine that a multipurpose internet mail extension (MIME) From Field of the first email comprises a domain of a first customer; and in response to the determination that the MIME From Field of the email comprises the domain of the first customer, route the first email to a first mail encryption gateway of the plurality of mail encryption gateways corresponding to the first customer;

determine that a source IP address of the second email matches an IP address of a second customer different from the first customer;

in response to the determination that the source IP address of the second email matches the IP address of the second customer, determine that an SMTP From Field of the second email is null;

in response to the determination that the SMTP From Field of the second email is null, determine that a MIME From Field of the second email comprises a domain of the second customer; and in response to the determination that the MIME From Field of the second email comprises the domain of the second customer, route the second email to a second mail encryption gateway of the plurality of mail encryption gateways corresponding to the second customer, the second mail encryption gateway different from the first mail encryption gateway.

14. The system of claim 13, wherein the router is further configured to:

receive a third email;

determine that a source IP address of the third email does not correspond to at least one of an IP address of a third customer, an IP address of a cloud provider, and an SPF record corresponding to the cloud provider; and in response to the determination that the source IP address of the third email does not correspond to at least one of the IP address of a third customer, the IP address of a cloud provider, and the SPF record corresponding to the cloud provider, communicate a message indicating that the second email is rejected.

15. The system of claim 13, wherein the router is further configured to:
  receive a third email;
  determine at least one of that an SMTP From Field of the third email does not comprise a domain of a third customer and that a MIME From Field of the third email does not comprise the domain of the third customer; and
  in response to the determination that at least one of that the SMTP From Field of the third email does not comprise the domain of the third customer and that the MIME From Field of the third email does not comprise the domain of the third customer, communicate a message indicating that the third email is rejected.

16. The system of claim 13, wherein the router is further configured to:
  receive a third email;
  determine that a source IP address of the third email matches an IP address of a third customer;
  in response to the determination that the source IP address of the third email matches the IP address of the third customer, determine that an SMTP From Field of the third email comprises a domain of the third customer; and
  in response to the determination that the SMTP From Field of the third email comprises the domain of the third customer, route the third email to a third mail encryption gateway of the plurality of mail encryption gateways corresponding to the third customer.

17. The system of claim 13, wherein the first mail encryption gateway sends the encrypted first email to an intended recipient of the first email.

18. The system of claim 13, wherein routing the first email to the first mail encryption gateway comprises inserting into a MIME header of the first email a code corresponding to the first customer.

* * * * *